United States Patent
Casto et al.

(10) Patent No.: US 9,167,799 B2
(45) Date of Patent: Oct. 27, 2015

(54) COLLAPSIBLE ANIMAL HOUSING ASSEMBLY

(75) Inventors: Jason Casto, Lombard, IL (US); Larry Sternal, Bartlett, IL (US)

(73) Assignee: CENTRAL GARDEN & PET COMPANY, Walnut Creek, CA (US)

( * ) Notice: Subject to any disclaimer, the term of this patent is extended or adjusted under 35 U.S.C. 154(b) by 383 days.

(21) Appl. No.: 13/557,416

(22) Filed: Jul. 25, 2012

(65) Prior Publication Data

US 2014/0026820 A1    Jan. 30, 2014

(51) Int. Cl.
  *A01K 1/03*   (2006.01)
  *A01K 31/06*  (2006.01)
  *A01K 31/08*  (2006.01)

(52) U.S. Cl.
  CPC .. *A01K 1/03* (2013.01); *A01K 31/08* (2013.01)

(58) Field of Classification Search
  CPC ..... A01K 1/0245; A01K 1/03; A01K 1/0236; A01K 1/0035; A01K 1/00; A01K 1/0272; A01K 1/035; A01K 31/06; A01K 1/029; A01K 31/00; A01K 31/07; A01K 31/08; A01K 31/14
  USPC ......... 119/472–475, 452–459, 496–499, 416, 119/482, 477, 513, 463, 461, 480, 491, 492, 119/437–441; D30/108, 109, 114, 116, 120
  See application file for complete search history.

(56) References Cited

U.S. PATENT DOCUMENTS

| | | | | |
|---|---|---|---|---|
| 1,198,524 A * | 9/1916 | Cunliffe | | 220/6 |
| 1,345,968 A * | 7/1920 | Speicher | | 119/487 |
| 1,449,428 A * | 3/1923 | McGaffee | | 119/494 |
| 4,140,080 A * | 2/1979 | Snader | | 119/473 |
| 4,909,188 A * | 3/1990 | Tominaga | | 119/474 |
| 4,917,047 A * | 4/1990 | Wazeter, III | | 119/474 |
| 5,054,426 A * | 10/1991 | Panarelli et al. | | 119/473 |
| 5,335,618 A * | 8/1994 | Zarola | | 119/498 |
| 5,469,807 A * | 11/1995 | Kosmaczeska | | 119/484 |
| 5,960,744 A * | 10/1999 | Rutman | | 119/473 |
| 7,681,532 B1 * | 3/2010 | Deane | | 119/473 |
| 8,141,517 B2 * | 3/2012 | Shimoda et al. | | 119/473 |
| 8,336,500 B1 * | 12/2012 | Britt | | 119/472 |
| 2005/0115516 A1 * | 6/2005 | Marchioro | | 119/705 |
| 2006/0005781 A1 * | 1/2006 | Marchioro | | 119/474 |
| 2009/0223461 A1 * | 9/2009 | Trunnell et al. | | 119/472 |
| 2010/0300371 A1 * | 12/2010 | Oeltjen et al. | | 119/474 |
| 2012/0210947 A1 * | 8/2012 | DiPaolo | | 119/472 |
| 2014/0116347 A1 * | 5/2014 | Casto et al. | | 119/474 |

* cited by examiner

*Primary Examiner* — Andrea Valenti
(74) *Attorney, Agent, or Firm* — Grossman, Tucker, Perreault & Pfleger, PLLC

(57) ABSTRACT

An animal housing assembly includes a cage coupled to a base assembly to provide an enclosure for one or more animals to be kept in captivity. The cage is collapsible such that the cage may transition from an expanded state, wherein the cage may cooperate with the base assembly to form an enclosure for an animal, to a collapsed state, wherein portions of the cage may fold into one another into a compact condition. The base assembly may transition from an assembled state, wherein first and second base members are releasably coupled to one another to form the base assembly, to a disassembled state, wherein the first and second base members are separated from one another, thereby allowing a more compact condition.

14 Claims, 14 Drawing Sheets

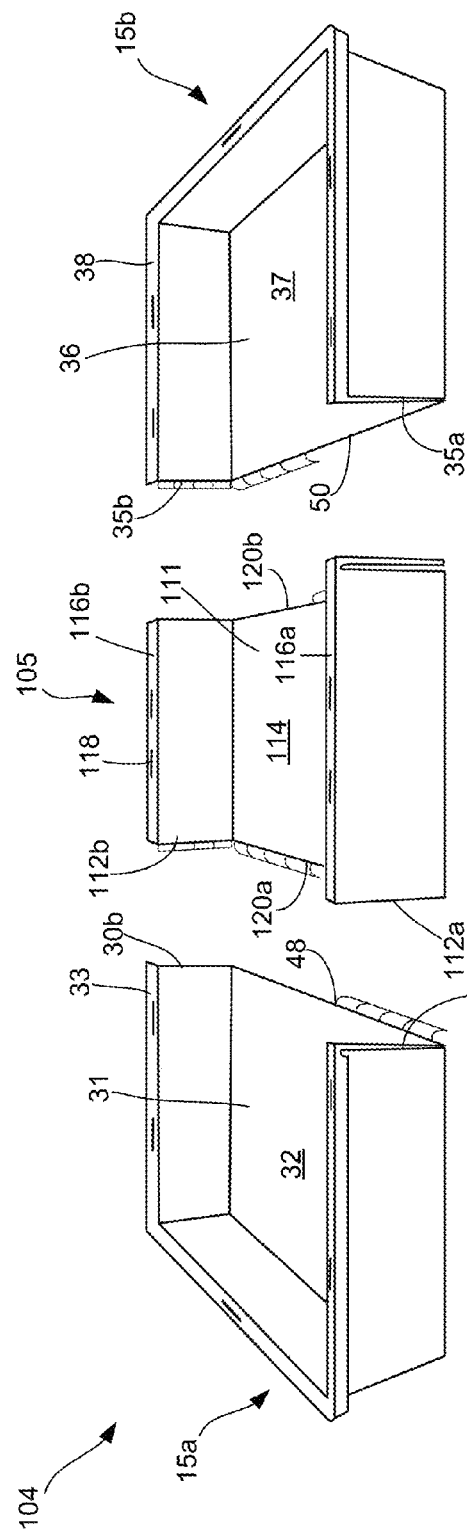
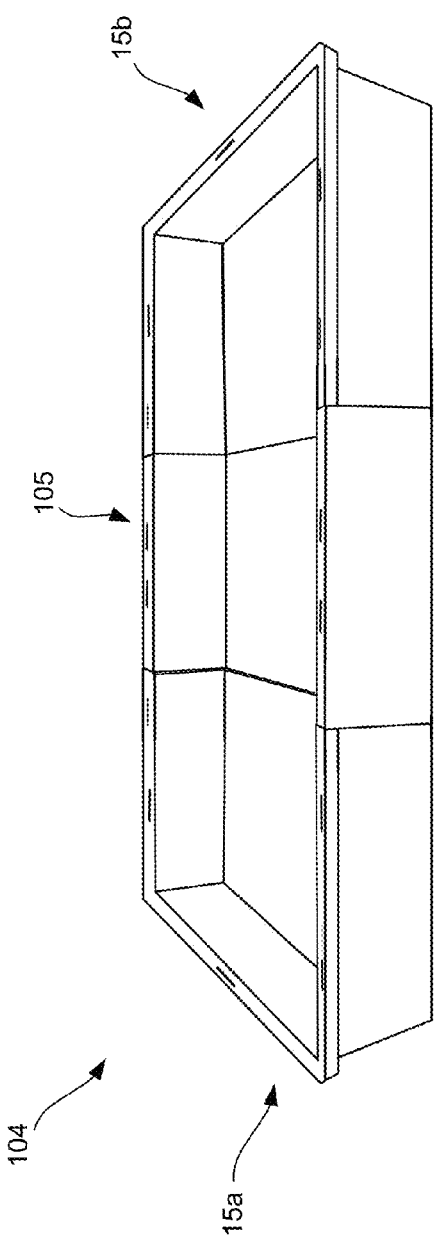
FIG. 17
FIG. 18

COLLAPSIBLE ANIMAL HOUSING ASSEMBLY

FIELD

The present disclosure relates generally to animal cages, and, more particularly, to a collapsible animal housing assembly.

BACKGROUND

Various types of pet or animal enclosures are used to accommodate, confine and/or transport pets or animals. Some current animal enclosures are formed having a rigid box shape and tend to be bulky, heavy and difficult to move from one location to another. More specifically, some current animal enclosures, particularly relatively large animal enclosures, are not able to be easily transported (e.g. stored in the trunk of a typical family vehicle). As such, a large vehicle, such as a truck or utility vehicle, may be required to transport animal enclosures, or the animal has to be left behind.

More recently, some foldable/collapsible animal enclosures have been introduced into the market place which may allow the enclosure to be disassembled into smaller, separate components. However, current collapsible animal enclosures tend to be bulky, of relatively high weight, difficult to move from one location to another, and more importantly, not sufficiently foldable/collapsible for ease of storage and transport. Additionally, some current collapsible animal enclosures require tools (e.g. a screw driver, a hammer, etc.) to assemble or dissemble the enclosures, which presents obvious drawbacks to the end user.

In short, current animal enclosures may be difficult to construct, take up valuable space in distribution and at retail outlets, difficult to transport for the distributor and retailer, difficult for consumers to transport home or to different locations, and difficult for consumers to store when not in use.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 17 is a perspective exploded view of base assembly of FIG. 15; and

FIG. 18 is a perspective view of the base assembly of FIG. 15 in an assembled state.

DETAILED DESCRIPTION

The present disclosure is generally directed to a collapsible animal housing assembly configured to provide a relatively simple means of assembly and disassembly. Generally, a collapsible animal housing assembly consistent with the present disclosure includes a cage coupled to a base assembly to provide an enclosure for one or more animals to be kept in captivity. The cage may be collapsible such that the cage may transition from an expanded state, wherein the cage may cooperate with the base assembly to form an enclosure for an animal, to a collapsed state, wherein portions of the cage may fold into one another into a compact condition. The base assembly may transition from an assembled state, wherein first and second base members are releasably coupled to one another to form the base assembly, to a disassembled state, wherein the first and second base members are separated from one another. The first and second base members may be correspondingly shaped and/or sized so as to allow a stackable configuration with one another, thereby providing a compact condition.

A collapsible animal housing assembly consistent with the present disclosure may provide a user with a relatively simple means of assembly and disassembly with relatively minimal effort. More specifically, the housing assembly can be readily converted into a compact condition for ease of storage and/or transport, while providing a relatively large enclosure when fully assembled. Additionally, the ability of at least the base assembly to be separated into smaller and separate components decreases the amount of space necessarily required for storage and/or shipping, thereby presenting obvious advantages for distributors and retailers.

Figure 1:
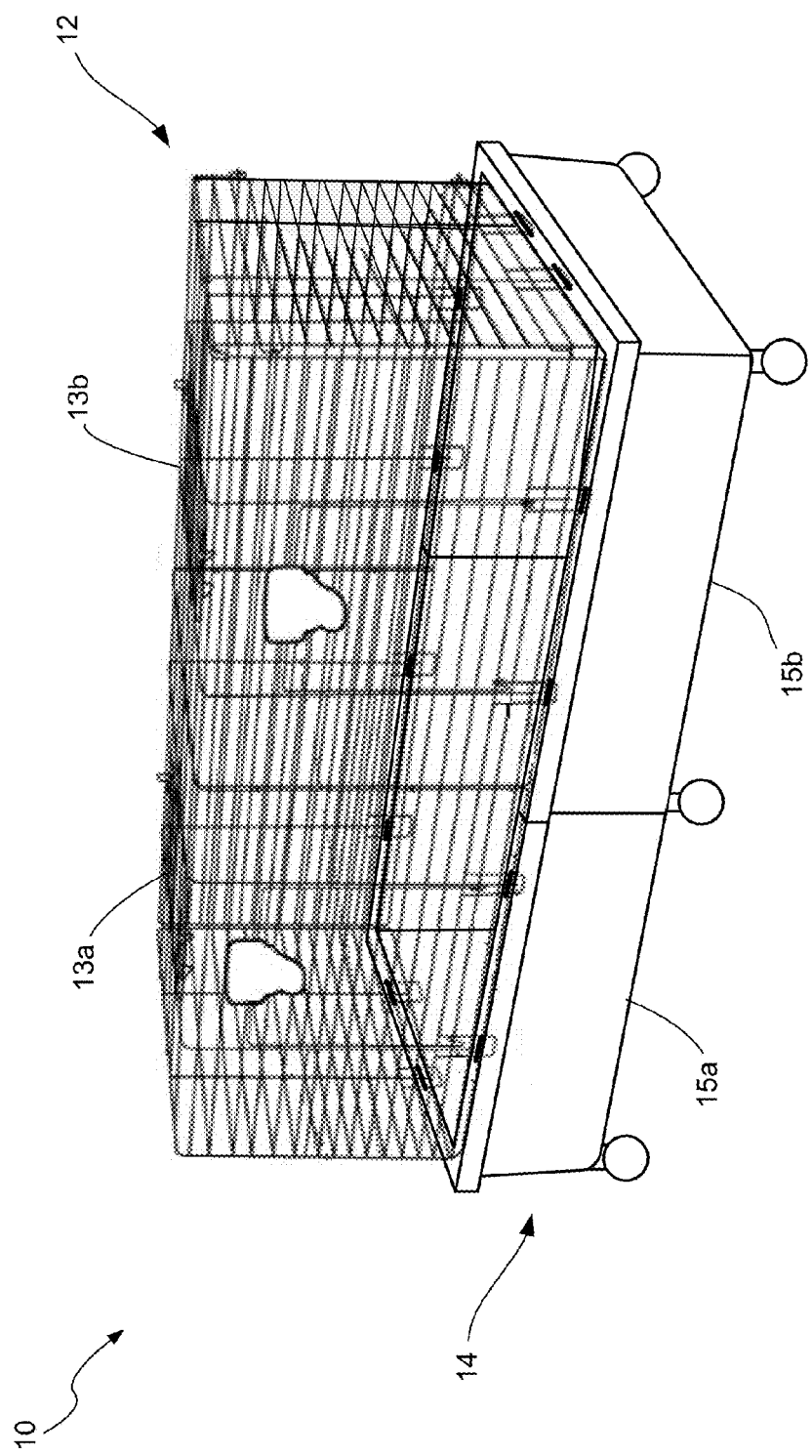
FIG. 1 is a perspective view of a collapsible animal housing assembly consistent with the present disclosure.

Turning to FIG. 1, a perspective view of an animal housing assembly 10 consistent with the present disclosure is illustrated in an assembled condition. Generally, the animal housing assembly 10 may include a cage 12 coupled to a base assembly 14. The cage 12 is in a expanded state and includes a first cage assembly 13a coupled to a second cage assembly 13b. The base assembly 14 includes a first base member 15a and a second base member 15b coupled thereto. As described in greater detail herein, the cage 12 is configured to be releasably coupled to the base assembly 14 such that the first and second cage assemblies 13a, 13b securely rest upon associated first and second base members 15a, 15b.

Figure 2:
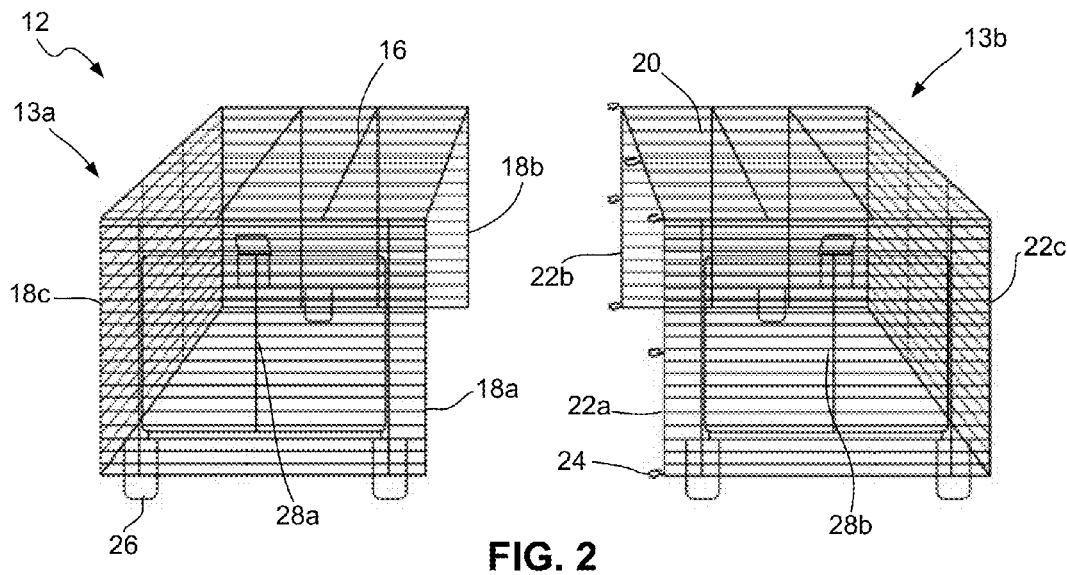
FIG. 2 is a perspective exploded view of the cage of FIG. 1.
Figure 3A:
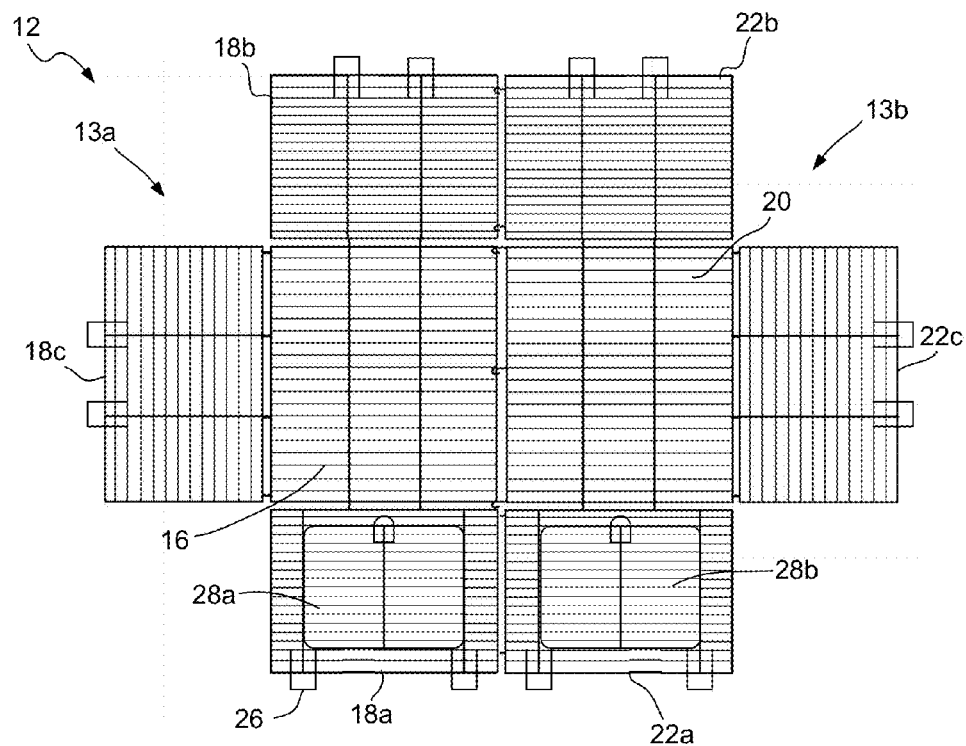
FIG. 3A is a plan view of the cage assembly of FIG. 1 showing the cage in a substantially flat state.

FIG. 2 is a perspective exploded view of the cage 12 showing the first and second cage assemblies 13a, 13b separated from one another. FIG. 3A is a plan view of the cage 12 showing the cage 12 in a substantially flat state. The first cage assembly 13a may include a top panel 16 having first, second and third side panels 18a, 18b, 18c, respectively, extending therefrom. As shown in FIG. 2, when in an expanded state, the first and second side panels 18a, 18b oppose one another and the third side panel 18c opposes an open end. The second cage assembly 13b is similar to the first cage assembly 13a. As shown, the second cage assembly 13b may include a top panel 20 having first, second and third side panels 22a, 22b, 22c, respectively, extending therefrom, wherein, when in the expanded state, the first and second side panels 22a, 22b oppose one another and the third side panel 22c opposes an open end.

As shown, each of the panels (16, 18a-18c, 20, 22a-22c) may be substantially flat and planar and may be coupled to one another such that the cage 12 is substantially rectangular in shape when the first and second cage assemblies 13a, 13b are coupled to one another at the open ends. More specifically, when the first and second cage assemblies 13a, 13b are coupled to one another, the top panels 16, 20, first side panels 18a, 22a, second side panels 18b, 22b and third side panels 18c, 22c form a substantially rectangular-like cage interior when the collapsible cage is in the expanded state.

In the illustrated embodiment, the panels may include a wire grill configuration. It should be noted that in other embodiments, the panels may include other configurations generally understood by one of ordinary skill in the art. The panels may be coupled to one another by a variety of known fastening methods and means. For example, some of the panels may be coupled to one another by way of one or more hinges, snap-fit members, hooks, and the like. The first and second cage assemblies 13a, 13b may be of modular nature such that all of the panels may be separated from one another. As described in greater detail herein, the first and second cage assemblies 13a, 13b may further be of knock down construction, where some of the panels may be folded into a substantially flat arrangement while still coupled to adjacent panels.

The first and second cage assemblies 13a, 13b may be releasably coupled to one another by one or more hooks 24. It should be noted that the first and second cage assemblies 13a, 13b may be coupled to one another by any known coupling means. In the illustrated embodiment, one or more panels of at least one of the first and second cage assemblies 13a, 13b may include at least one hook 24 configured to be coupled to an adjacent panel. For example, as shown, hooks 24 may extend from the top panel 20 and first and second side panels 22a, 22b of the second cage assembly 13b. As shown, the top panels 16, 20 of the first and second cage assemblies 13a, 13b may be coupled to one another by at least one hook 24. Similarly, the first and second side panels 18a, 18b of the first cage assembly 13a may be coupled to the first and second side panels 22a, 22b of the second cage assembly 13b, respectively, by hooks 24.

As shown, one or more protrusions 26 may extend from the first and second cage assemblies 13a, 13b. More specifically, some of the side panels (18a-18c and 22a-22c) may include at least one protrusion 26 extending therefrom. Each protrusion 26 may be configured to couple the first and second cage assemblies 13a, 13b to the associated first and second base members 15a, 15b of the base assembly 14, described in greater detail herein.

Some of the panels may include one or more doors for permitting entry and egress from within the cage 12. For example, side panels 18a, 22a of the first and second cage assemblies 13a, 13b may each include a door 15a, 15b pivotally supported so that each may move from a closed position, in which the doors 15a, 15b are substantially parallel to the respective panel 18a, 22a, to an open position, in which the doors 15a, 15b may be substantially perpendicular to the respective panel 18a, 22a. In some embodiments, at least one of the top panels 16, 20 may include a door (shown in FIG. 7) permitting access to the cage 12.

Figure 3B:
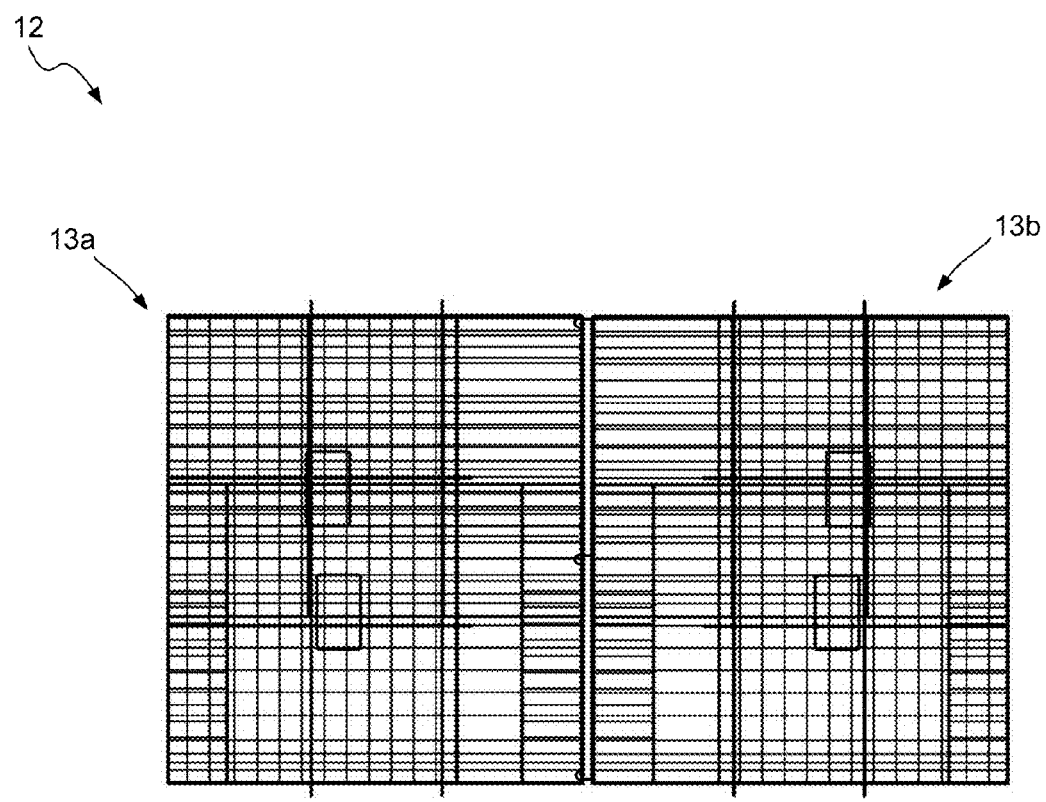
FIG. 3B is a plan view the cage of FIG. 1 showing the cage in a folded state.

FIG. 3B is a plan view the cage 12 showing the cage 12 in a collapsed state. As previously described, at least some of the panels may be coupled to one another by way of hinges, such that some panels may rotate in relation to one another while remaining attached. Accordingly, the cage 12 may be of knock down construction, where some of the panels may be folded into a substantially flat arrangement while still coupled to adjacent panels. For example, the panels of the first and second cage assemblies 13a, 13b may be folded into a more compact condition. It should be noted that the first and second cage assemblies 13a, 13b may further be folded onto one another into a more compact condition.

Figure 4:
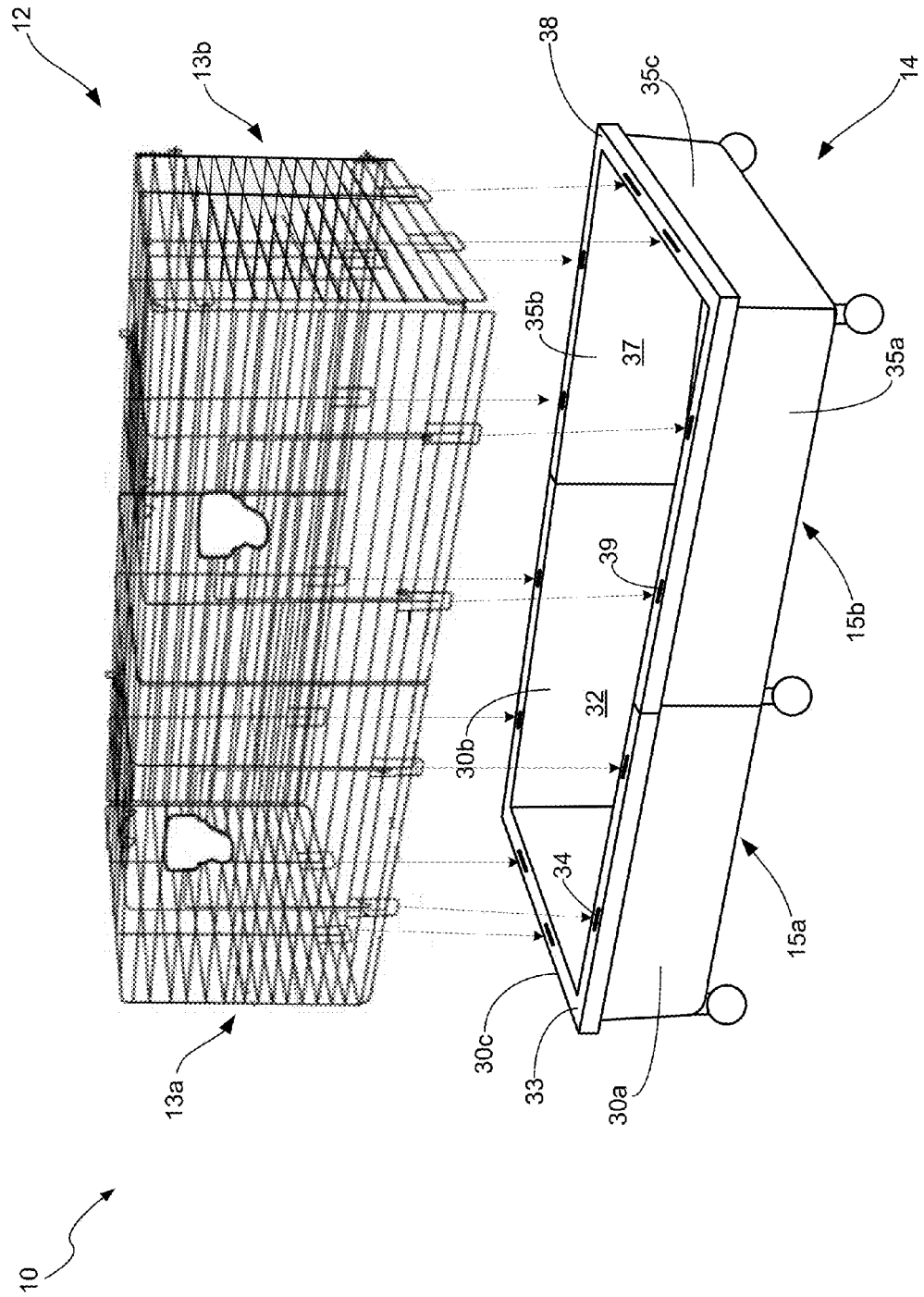
FIG. 4 is a perspective exploded view of the collapsible animal housing assembly of FIG. 1.

FIG. 4 is an exploded view of the animal housing assembly 10. In the illustrated embodiment, the cage 12 is in the expanded state, wherein the first and second cage assemblies 13a, 13b are coupled to one another and configured to cooperate with the base assembly 14 to form an enclosure for an animal. In the illustrated embodiment, the first base member 15a includes a floor 31 (shown more clearly in FIG. 5) and three side walls 30a, 30b, 30c extending upwardly therefrom forming a cavity 32 within. As shown, the side walls 30a and 30b oppose one another and side wall 30c opposes an open end. The side walls 30a-30c may terminate at an edge 33 extending along a periphery of the first base member 15a. As shown, the edge 33 may include one or more recesses or slots 34 shaped and/or sized to receive protrusions 26 extending from one or more panels of the cage 12, thereby allowing the panels of the cage 12 to securely rest upon the edge 33 of corresponding side walls of the first base member 15a. For example, protrusions 26 extending from side panels of the first cage assembly 13a may be received within corresponding slots 34 defined on the edge 33 of side walls 30a, 30b, 30c of the first base member 15a.

The second base member 15b includes a floor 36 (shown more clearly in FIG. 5) and three side walls 35a, 35b, 35c extending therefrom, thereby forming a cavity 37 within. As shown, the side walls 35a and 35b oppose one another and side wall 35c opposes an open end. The side walls 35a-35c may terminate at an edge 38 extending along a periphery of the second base member 15b. As shown, the edge 38 may include one or more recesses or slots 39 shaped and/or sized to receive protrusions 26 extending from one or more panels of the cage 12, thereby allowing the panels of the cage 12 to securely rest upon the edge 38 of corresponding side walls of the second base member 15b. For example, protrusions 26 extending from panels of the second cage assembly 13b may be received within corresponding slots 39 defined on the edge 38 of side walls 35a, 35b, 35c of the second base member 15b.

It should be noted that the cage 12 may further include a locking mechanism (not shown) to secure the cage 12 to the base assembly 14. The locking mechanism may include any known mechanism generally understood by one skilled in the art to securely hold the cage 12 in contact with the base assembly 14. For example, one or more pivoting latches may be located on the first and/or second cage assemblies 13a, 13b and may be configured to secure a portion of the first and/or second base members 15a, 15b with a panel of the first and/or second cage assembly 13a, 13b. As generally understood by one skilled in the art, the pivoting latch may include flanges configured to extend under edges 33, 38 of at least one of the first and second base members 15a, 15b to hold the first and/or second cage assemblies 13a, 13b to the base assembly 14 when the latch is in the closed position. It should be noted that in other embodiments, other types of known locking mechanism may be used, such as rotating knobs, snaps, etc.

Figure 5:
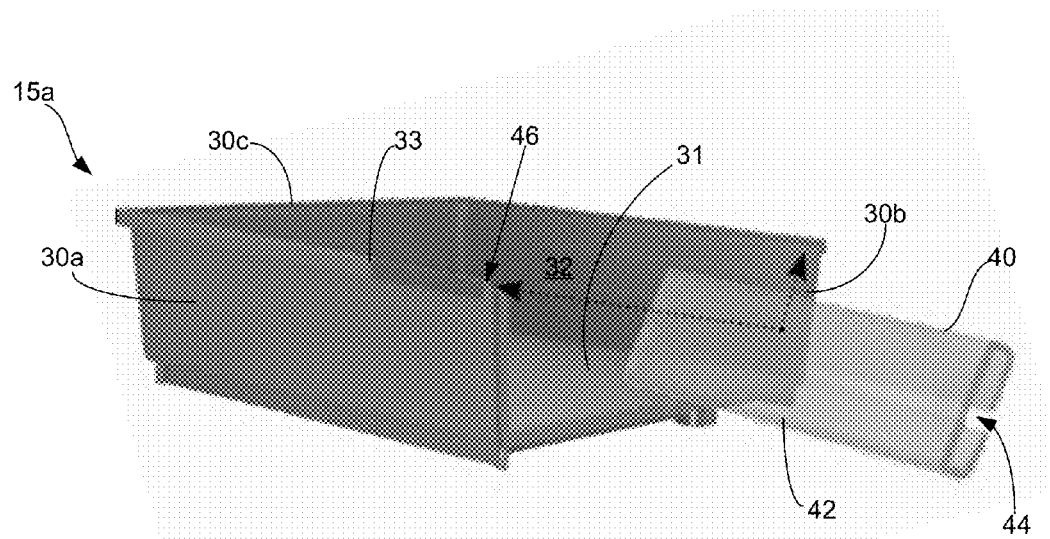
FIG. 5 is a perspective view of a first base member of a base assembly consistent with the present disclosure.

Turning now to FIG. 5, a perspective view of the first base member 15a of the base assembly 14 is illustrated. In preparation for coupling the first and second base members 15a, 15b to one another, a locking member 40 may be first positioned over a portion of the edge 33 of the first base member 15a. It should be noted that the locking member 40 may alternatively be first positioned over the second base member 15b. The locking member 40 may be configured to retain the first and second base members 15a, 15b to one another. As shown, the locking member 40 includes a body portion 42 having a channel 44 extending a length thereof. The edge 33 of the first base member 15a may be shaped and/or sized to be received within the channel 44 of the locking member 40. As shown, the locking member 40 may be coupled to a portion of the edge 33 (e.g. slide the locking member 40 over a portion of the edge 33 adjacent side wall 30a, as indicated by arrow 46) such that the edge 33 may be slidingly received within the channel 44. A second locking member (not shown) may be slid over the edge 33 adjacent side wall 30b.

Figure 6:
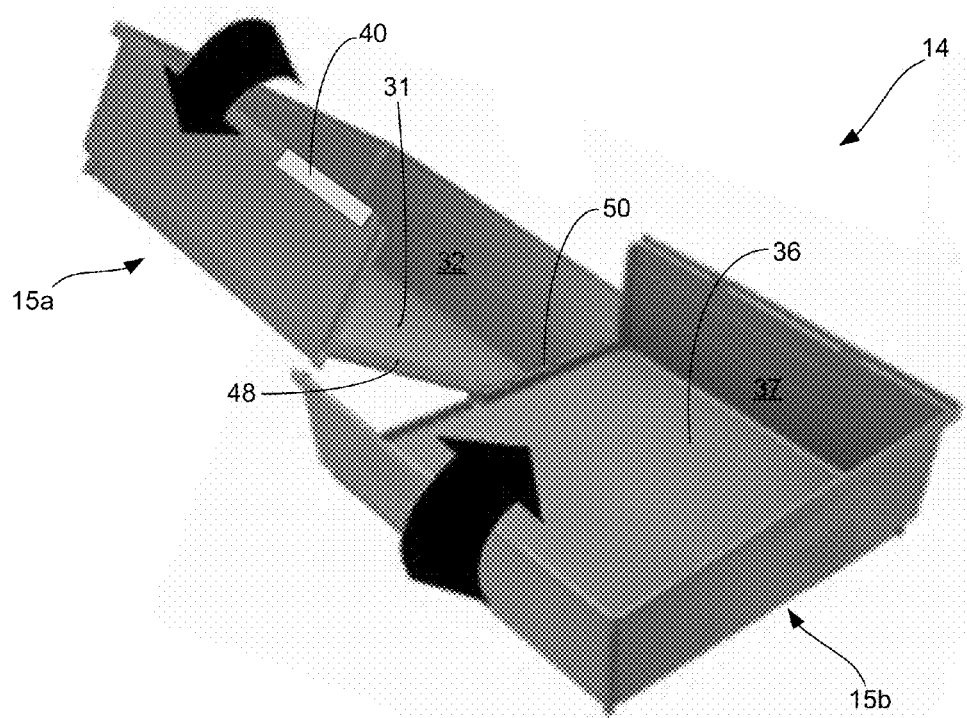
FIGS. 6 and 7 illustrate methods of coupling and securing the first and second base members of the base assembly to one another to form the base assembly consistent with the present disclosure.
Figure 7:
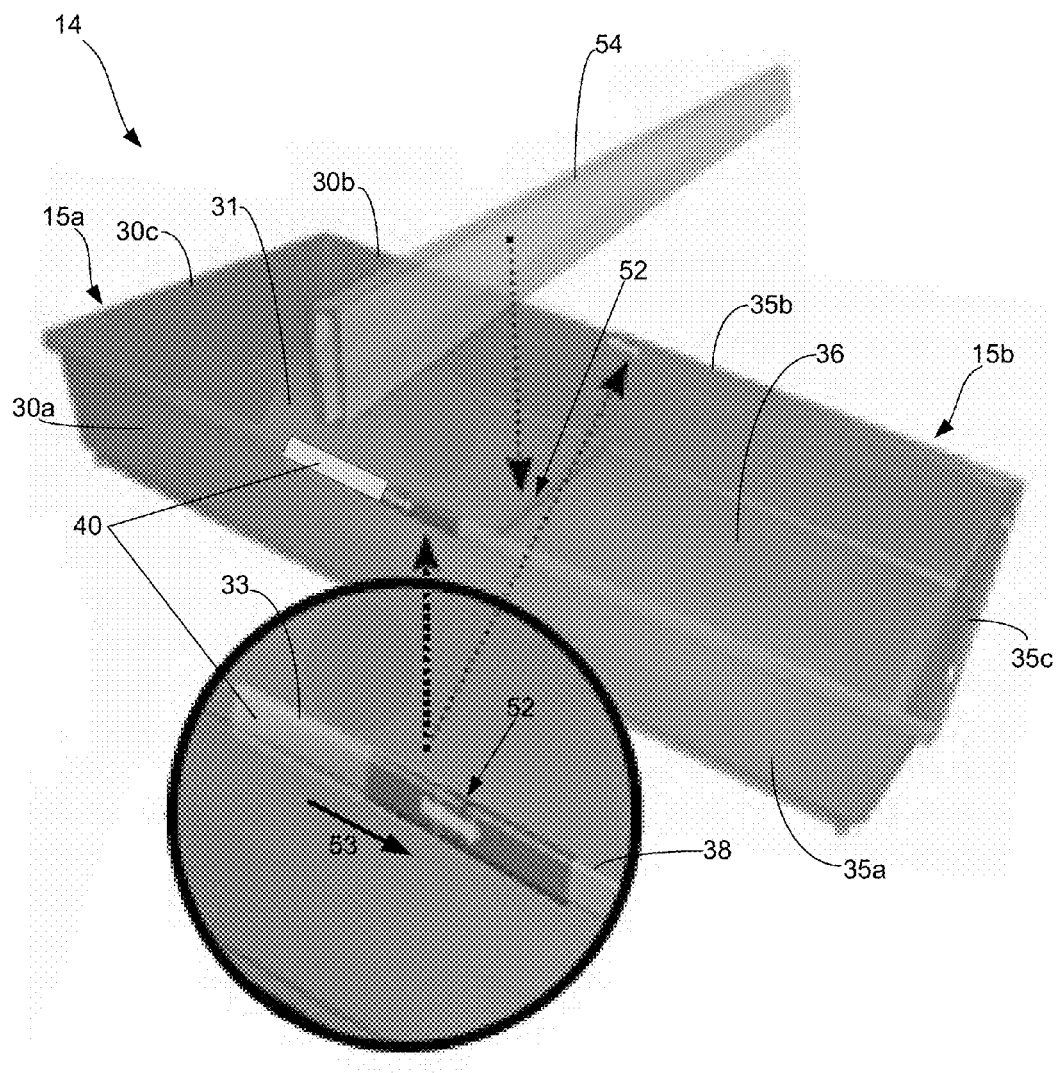

FIGS. 6 and 7 illustrate methods of coupling and securing the first and second base members 15a, 15b to one another to form the base assembly 14. As shown, the first and second base members 15a, 15b may be coupled to one another by way of the floors 31 and 36. As shown, the floor 31 of the first base member 15a may include a leading edge 48 adjacent the open end. Similarly, the floor 36 of the second base member 15b may include a leading edge 50 adjacent the open end. In the illustrated embodiment, the leading edge 48 of the first base member 15a include first and second portions configured to cooperate with associated first and second portions of the leading edge 50 of the second base member 15b. For example, a first portion of the leading edge 50 of the second base member 15b may be configured to receive and retain an associated first portion of the leading edge 48 of the first base member 15a in a locking fashion. For example, the first portion of the leading edge 50 of the second base member 15b may include one or more recesses shaped and/or sized to receive one or more corresponding protrusions on the first portion of the leading edge 48 of the first base member 15a. Similarly, the second portion of the leading edge 48 of the first base member 15a may be configured to receive and retain an associated second portion of the leading edge 50 of the second base member 15b.

As shown, the floors 31, 36 of the first and second base members 15a, 15b may be positioned in relation to one another such that rotation of the first and second base members 15a, 15b in opposing directions, as indicated by the arrows, results in the first portion of the leading edge 48 of the first base member 15a to be received and retained within the corresponding first portion of the leading edge 50 of the second base member 15b. It should be noted that in other embodiments, coupling of the floors 31, 36 of the first and second base members 15a, 15b may not be limited to a rotational movement.

Upon coupling the first and second base members 15a, 15b to one another, the base assembly 14 is formed. More specifically, as shown in FIG. 7, when the first and second base members 15a, 15b are coupled to one another, the base assembly 14 may be substantially rectangular in shape, such that side walls 30a, 35a form a first side wall and side walls 30b, 35b form an opposing second side wall and side walls 30c and 35c oppose one another. The floors 31, 36 may also meet at their respective leading edges 48, 50 and form a substantially planar surface.

As shown, a seam 52 may be present between the first and second base members 15a, 15b, extending from side walls 30a, 35a across the floors 31, 36 to side walls 30b, 35b. The locking member 40 may be positioned over a portion of the seam 52 adjacent the side walls 30a, 35a. More specifically, the channel 44 of the locking member 40 may be shaped and/or sized to receive the edge 38 of the second base member 15b, such that the locking member 40 may be positioned over a portion of the edges 33 and 38 of the first and second base members 15a, 15b, as indicated by arrow 53. The locking member 40 may be configured to retain at least a portion (e.g. edges 33, 38 adjacent side walls 30a, 35a) of the first and second base members 15a, 15b to one another and to prevent movement of the first and second base members 15a, 15b relative to one another. A second locking member (not shown) may be positioned over a portion of both edges 33 and 38 adjacent the side walls 30b, 35b of the first and second base members 15a, 15b.

In the illustrated embodiment, a third locking member 54 may be positioned over a portion of the leading edges 48, 50 of the floors 31, 36 of the first and second base members 15a, 15b, such that the third locking member 54 is positioned over the seam 52. The third locking member 54 may be configured to retain at least a portion (e.g. leading edges 48, 50 of the floors 31, 36) of the first and second base members 15a, 15b to one another and to prevent movement of the first and second base members 15a, 15b relative to one another. Additionally, the third locking member 54 may further be configured to prevent materials (e.g. animal waste, food, water, etc.) from leaking from the floors 31, 36 of the base assembly 14 by way of the seam 52.

The first and second base members 15a, 15b may be configured to be stackable with one another. For example, when in a disassembled state, the first base member 15a may be shaped and/or sized such that a portion of the second base member 15b may be received within the cavity 32 of the first base member 15a. It should be noted that the second base member 15b may be similarly configured to receive the first base member 15a within the cavity 37. As such, the first and second base members 15a, 15b may have corresponding contours and dimensions. Additionally, the cavities 32, 37 of the first and second base members 15a, 15b, respectively, may each be shaped and/or sized to receive the first and second cage assemblies 13a, 13b when in collapsed states, thereby allowing easy storage and transportation of the cage 12 and base assembly 14.

The first and second base members 15a, 15b may include one or more durable and chew-resistant materials configured to provide relatively easy clean up of material wastes, including animal excrement. The material may include, but is not limited to, either natural or synthetic materials such as polymers and/or co-polymers. Examples may include polyurethane, latex, natural rubber, nylon (polyamides), polyester, polyethylene, polypropylene, PVC, fluoroplastics, block copolymers, polyethers and composites thereof. The floors 31, 36 of the first and second base members 15a, 15b may further include a coating configured to provide relatively low friction that may provide improved cleaning performance. For example, the coating may be one that inherently rejects the attachment of animal wastes and thereby provides a user with a much easier task of maintaining a clean surface and sanitary conditions.

Figure 8:
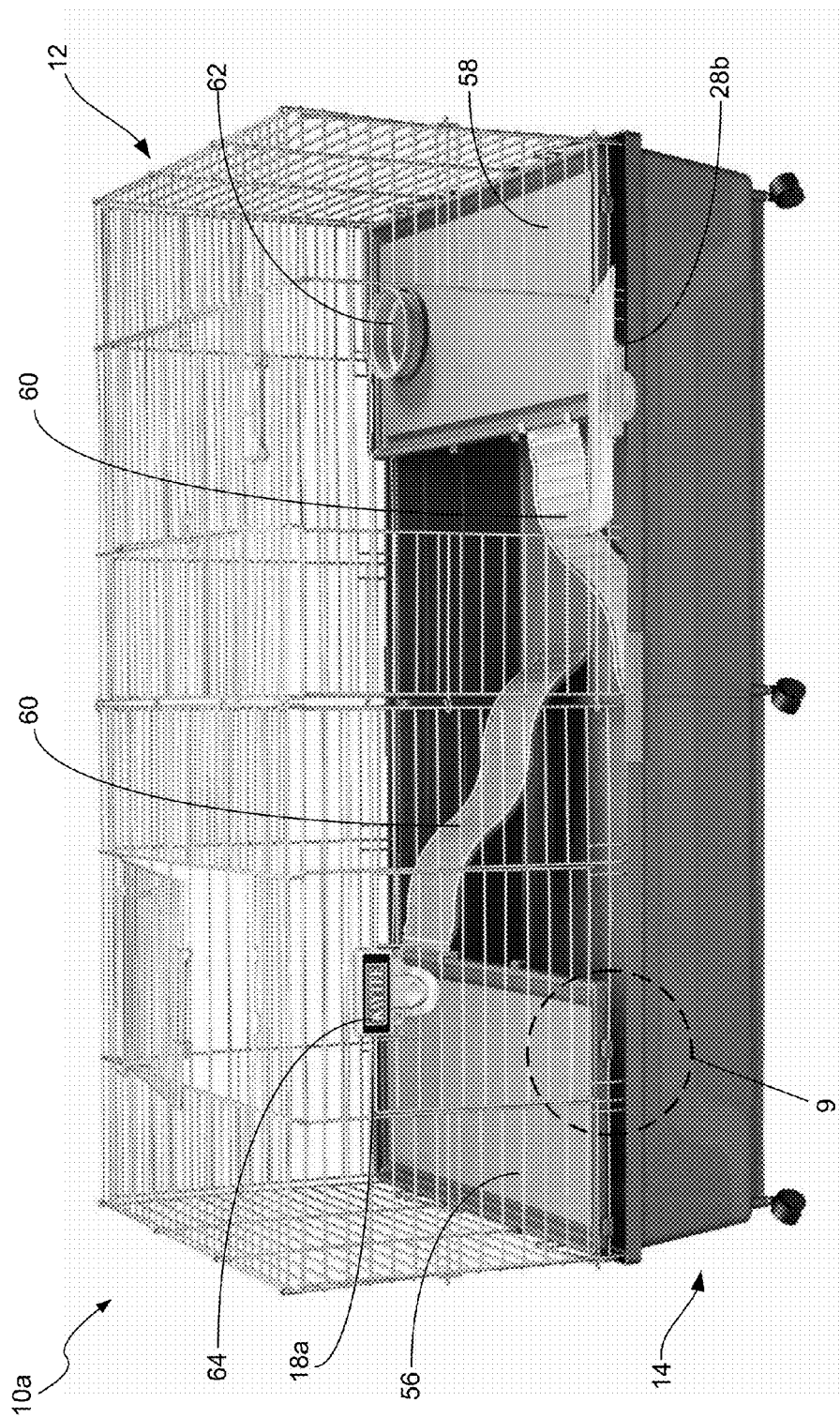
FIG. 8 is a perspective view of a collapsible animal housing assembly consistent with the present disclosure including shelf members, ramp members and a food/water container positioned within.

Turning to FIGS. 8-11, a variety of accessories configured to be included within the collapsible animal housing assembly 10a consistent with the present disclosure are illustrated. FIG. 8 is a perspective view of the collapsible animal housing assembly 10a including first and second shelf members 56, 58, ramp members 60, and a food/water container 62 positioned within. The housing assembly 10a may further include a locking member 64 configured to provide a means of selectively securing one or more doors of the cage 12 in a closed position, described in greater detail herein.

Figure 9:
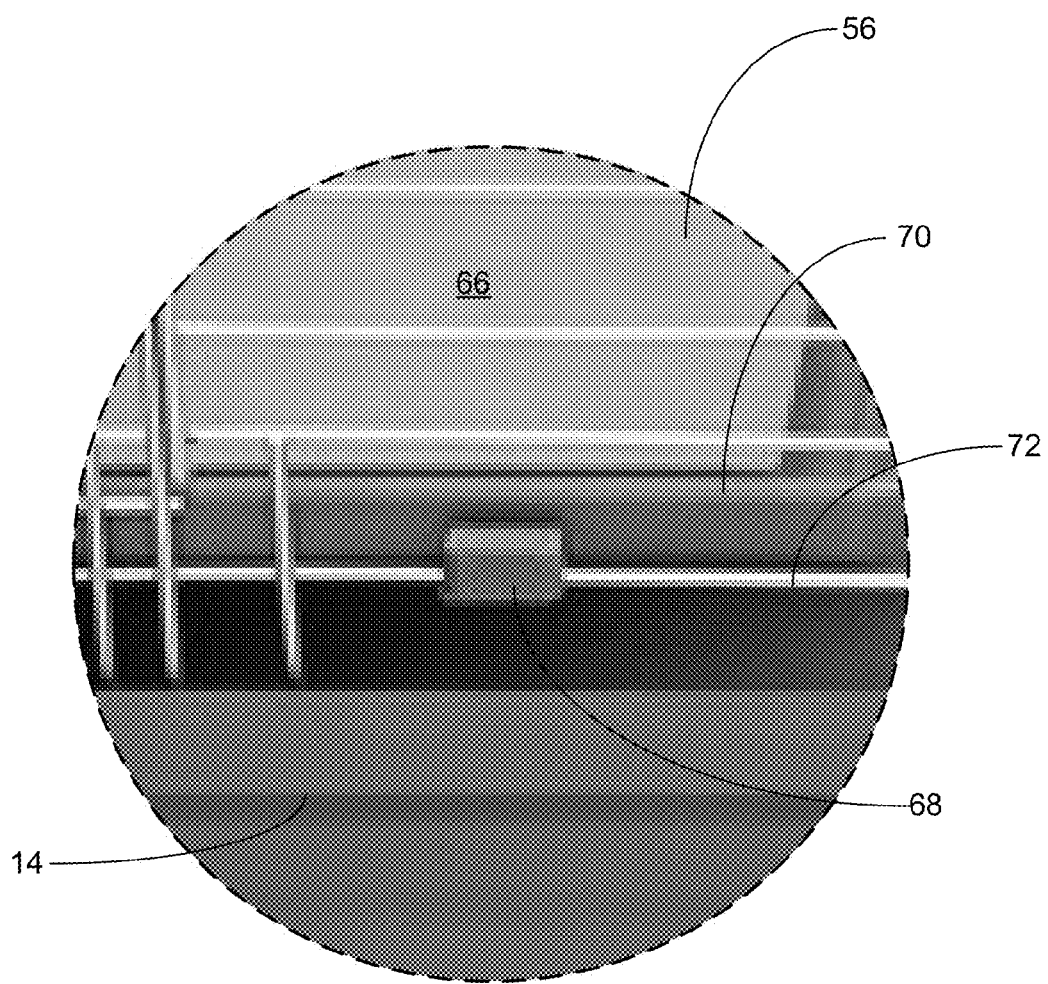
FIG. 9 is an enlarged perspective view of a portion of the collapsible animal housing assembly of FIG. 8 illustrating a shelf member coupled to a portion of the cage.

As described in greater detail herein, the first and second shelf members 56, 58 may be coupled to and retained within the cage 12. The height at which the shelf members 56, 58 are positioned within the cage 12 may be adjustable. For example, as shown in FIG. 9, the first shelf member 56 may include a body portion 66 having a least one protrusion 68 extending from a periphery 70 thereof. The protrusion 68 may be coupled to at least one grill wire 72 (grill wire 72 in horizontal orientation) of a panel of the cage 12, wherein the shelf member 56 is held within the cage 12 by way of the grill wire 72. As generally understood, the protrusion 68 may be coupled to the grill wire 72 by any known means. For example, in one embodiment, the protrusion 68 may be shaped and/or sized to receive a portion of the grill wire 72 such that the protrusion 68 rests on the grill wire 72. In another embodiment, the protrusion 68 may be coupled to the grill wire 72 by snap-fit connection.

Figure 10:
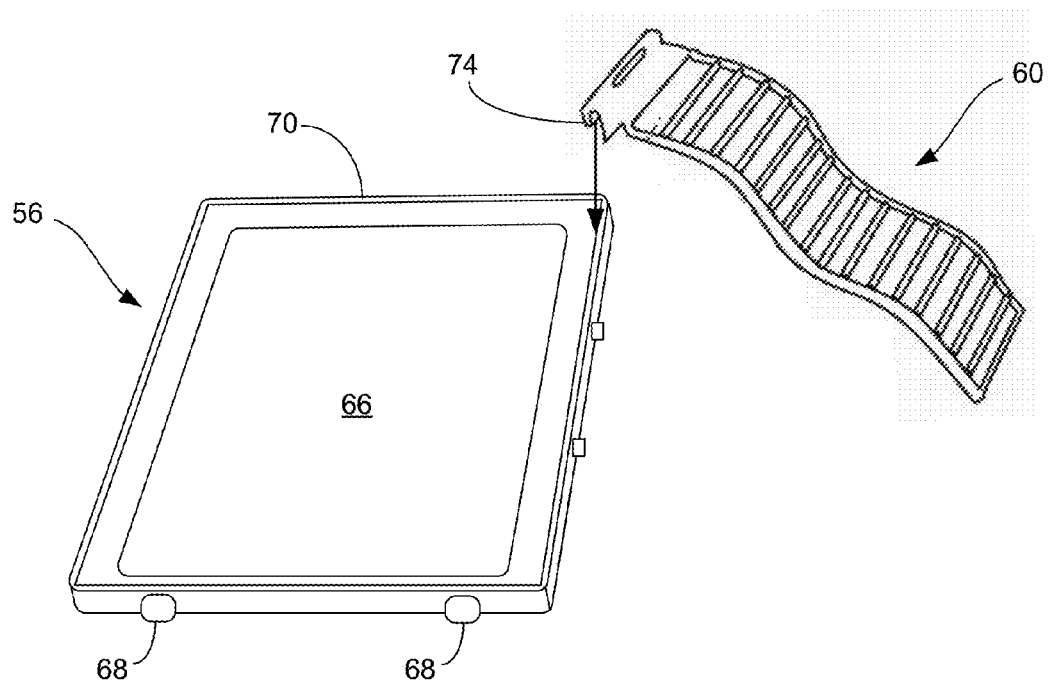
FIG. 10 is a perspective view of a shelf member and ramp member consistent with the present disclosure.

Turning to FIG. 10, the first shelf member 56 and ramp member 60 consistent with the present disclosure are illustrated. As shown, the first shelf member 56 includes a body portion 66 and one or more protrusions 68 extending from a periphery 70. The ramp member 60 may be coupled to the first shelf member 56 by way of a snap-fit means 74. More specifically, the snap-fit means 74 may include a channel configured to receive a raised edge of the periphery 70 of the first base member 56. The ramp member 60 may be coupled to the first shelf member by other known means.

Figure 11:
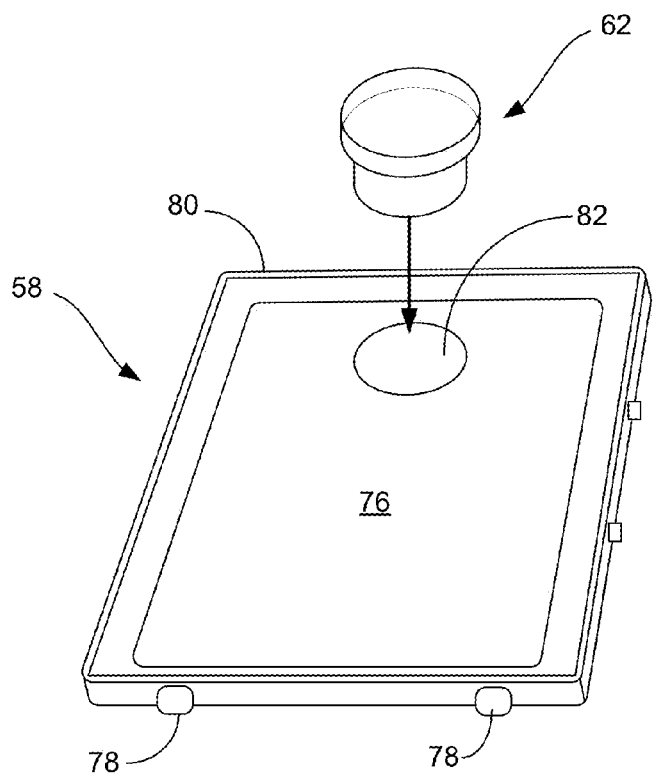
FIG. 11 is a perspective view of a shelf member and food/water container consistent with the present disclosure.

Turning to FIG. 11, the second shelf member 58 and a food/water container 62 consistent with the present disclosure are illustrated. The second shelf member 58 may include a body portion 76 having one or more protrusions 78 extending from a periphery 80 thereof. Similar to the protrusions 68 of the first shelf member 56, the protrusions 78 may be coupled to one or more grill wires of one or more panels of the cage 12, in a similar fashion, thereby allowing the second shelf member 58 to be positioned within the cage 12. The second shelf member 58 may further include an aperture 82 extending through the body portion 76. The aperture 82 may be shaped and/or sized to receive and retain a portion of the food/water container 62.

The first and second shelf members 56, 58, the ramp members 60 and the food/water container 62 may include one or more durable and chew-resistant materials configured to provide relatively easy clean up of material wastes, including animal excrement. The material may include, but is not limited to, either natural or synthetic materials such as polymers and/or co-polymers. Examples may include polyurethane, latex, natural rubber, nylon (polyamides), polyester, polyethylene, polypropylene, PVC, fluoroplastics, block copolymers, polyethers and composites thereof.

Figure 12:
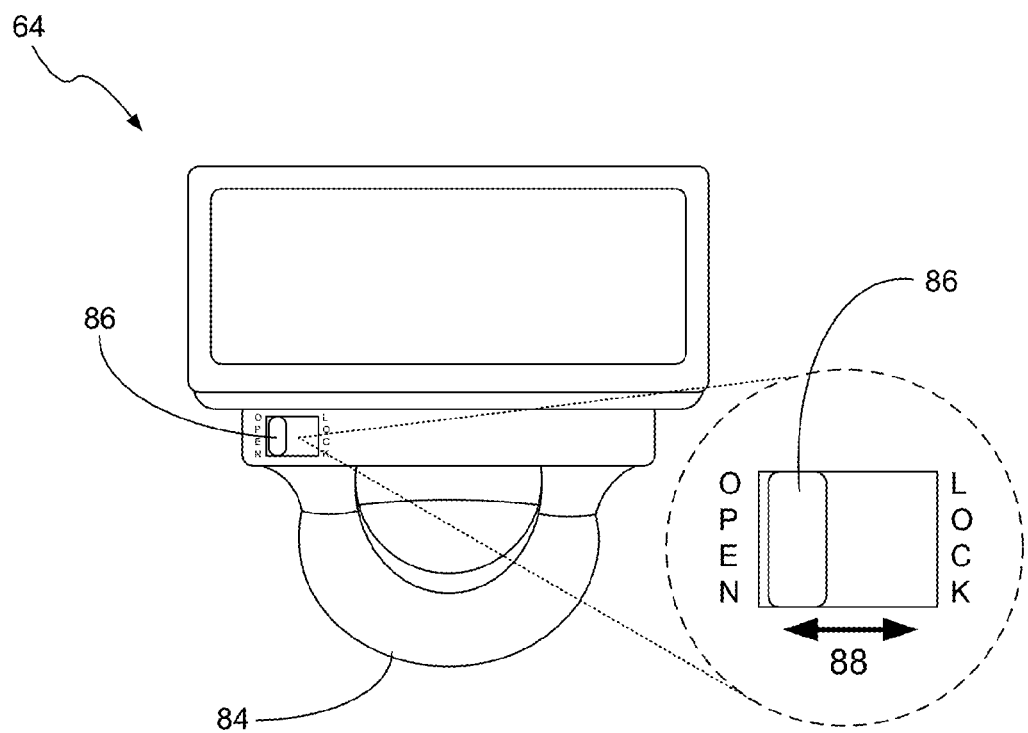
FIGS. 12 and 13 illustrate methods of operating a locking member of a collapsible animal housing assembly consistent with the present disclosure.
Figure 13:
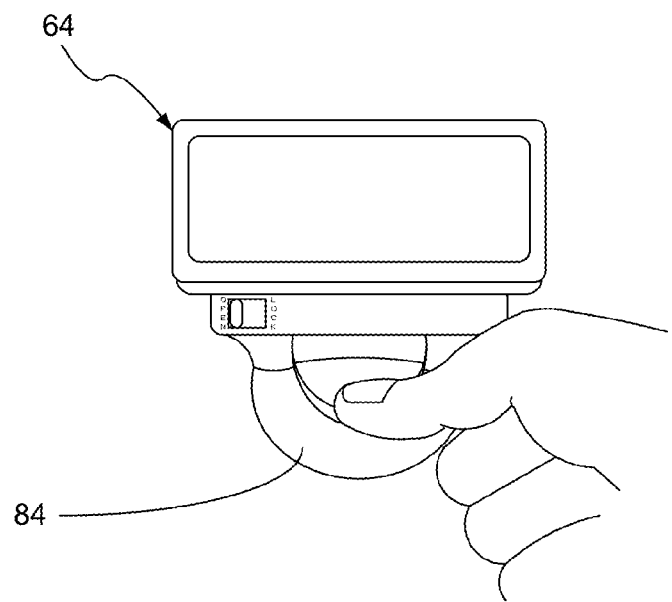

FIGS. 12 and 13 illustrate methods of operating a locking member 64 of one or more doors of the animal housing assembly 10 consistent with the present disclosure. Generally, the locking member 64 may be provided to secure a door (e.g. door 28a) of the cage 12 in a closed position. As shown, the locking member 64 may include a handle 84 and a selectable locking switch 86. The locking member 64 may include a means of engaging (e.g. locking) and disengaging (unlocking) a portion of the wire grill of a panel upon which the door 28a is positioned. The handle 84 may be manipulated (e.g. pulled in a first direction) so as to disengage the locking member 64 from the wire grill and allow the door 28a to open.

The locking switch 86 may be configured to prevent movement of the handle 84, thereby effectively preventing the door 28a from being opened. For example, in one embodiment, the locking switch 86 may be moveable between a disengaged position (e.g. open) and an engaged position (e.g. lock) as indicated by arrows 88. When the locking switch 86 is in an engaged position, the locking switch 86 may prevent the handle 84 from moving and when the locking switch 86 is in a disengaged position, the handle 84 may be moved.

Figure 14:
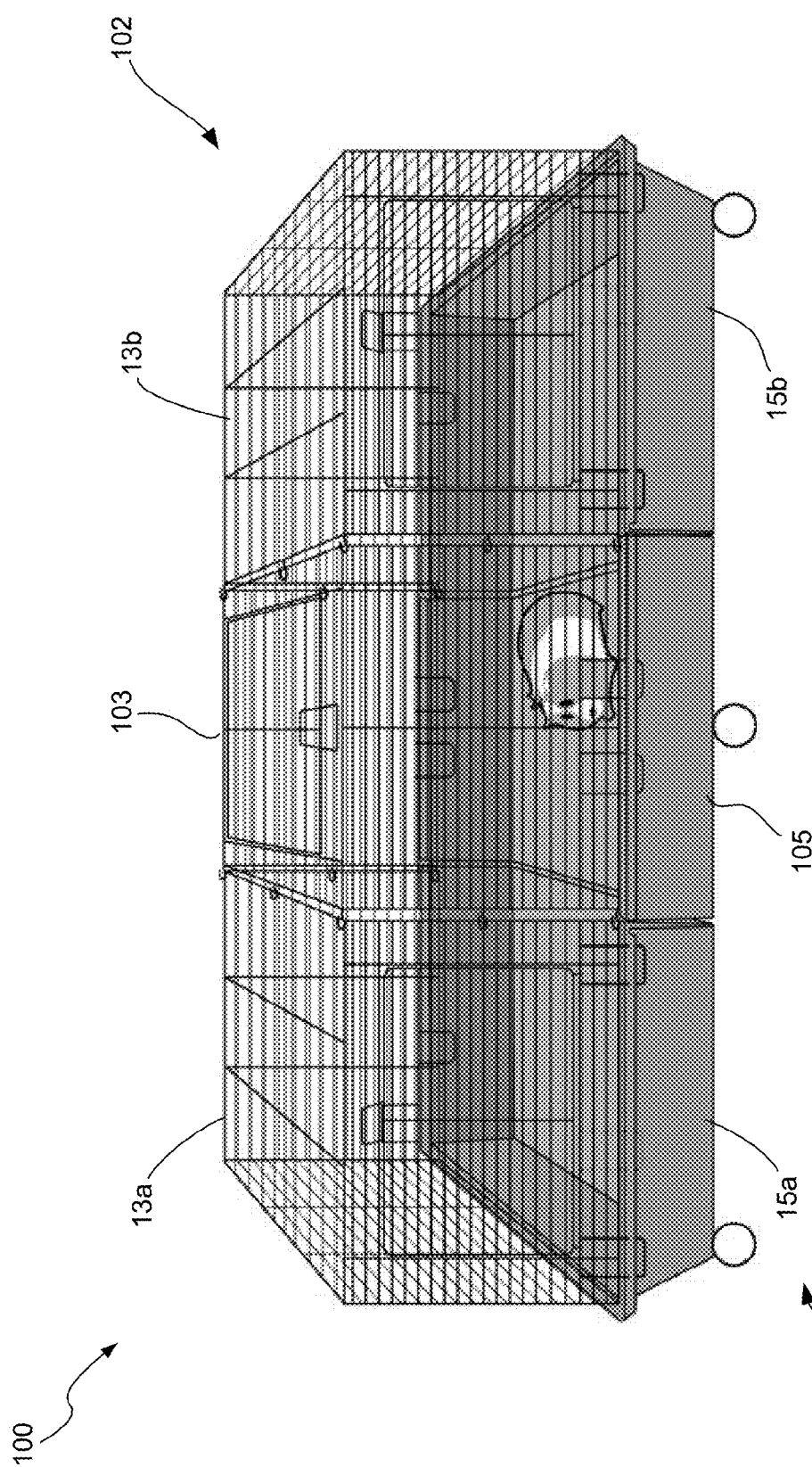
FIG. 14 is a perspective view of a collapsible animal housing assembly consistent with the present disclosure.

Turning to FIG. 14, a perspective view of an animal housing assembly 100 consistent with the present disclosure is illustrated in an expanded state. Generally, the animal housing assembly 100 may include a cage 102 coupled to a base assembly 104. The cage 102 and base assembly 104 are similar to the cage 12 and base assembly 14 of the animal housing assembly 10 described herein. In particular, the cage 102 includes the first and second cage assemblies 13a, 13b. Additionally, the cage 102 includes a third cage assembly 103 coupled to the first and second cage assemblies 13a, 13b. As described in greater detail herein, the third cage assembly 103 is configured to allow expansion of the cage 12, thereby resulting in larger cage 102. The base assembly 104 includes the first and second base members 15a, 15b. Additionally, the base assembly 104 includes a third base member 105 coupled to the first and second base members 15a, 15b. Similar to the third cage assembly 103, the third base member 105 is configured to provide expansion of the base assembly 14, thereby resulting in a large base assembly 104.

Figure 15:
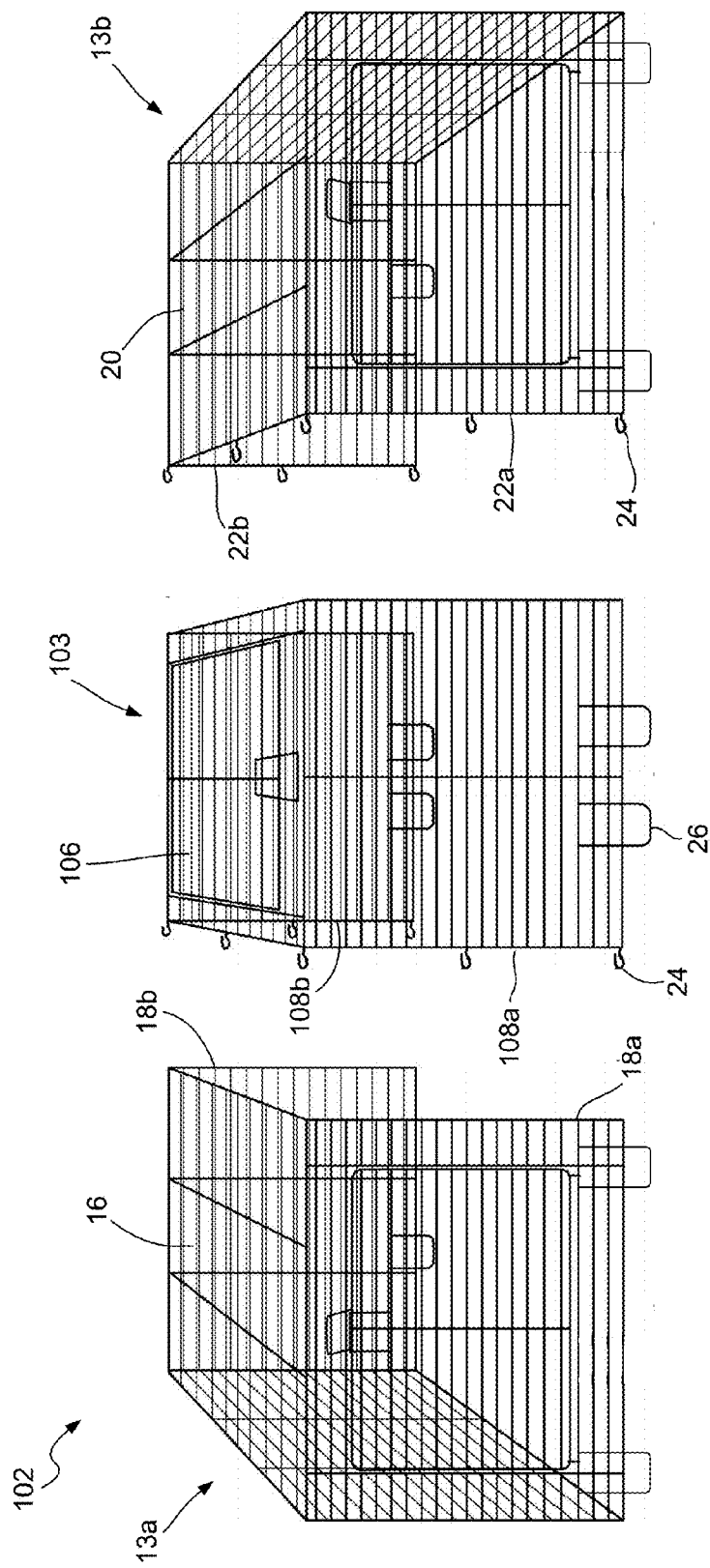
FIG. 15 is a perspective exploded view of the cage of FIG. 15.
Figure 16A:
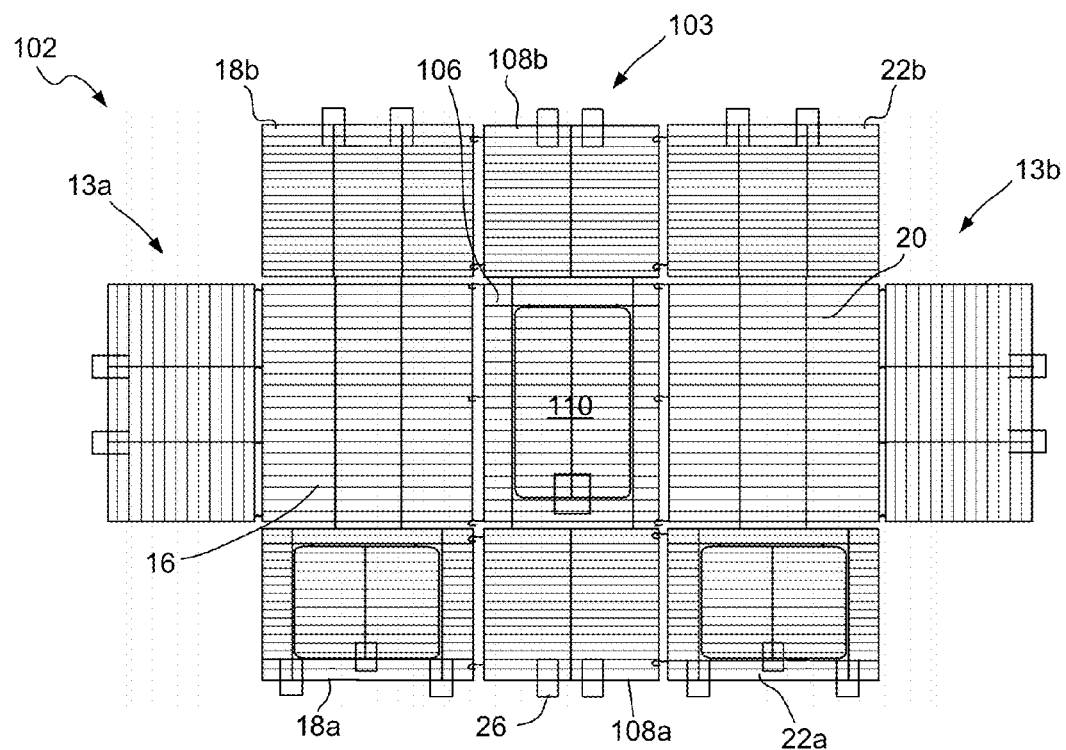
FIGS. 16A and 16B are plan views of the cage of FIG. 15 showing the cage in substantially flat and folded states, respectively.
Figure 16B:
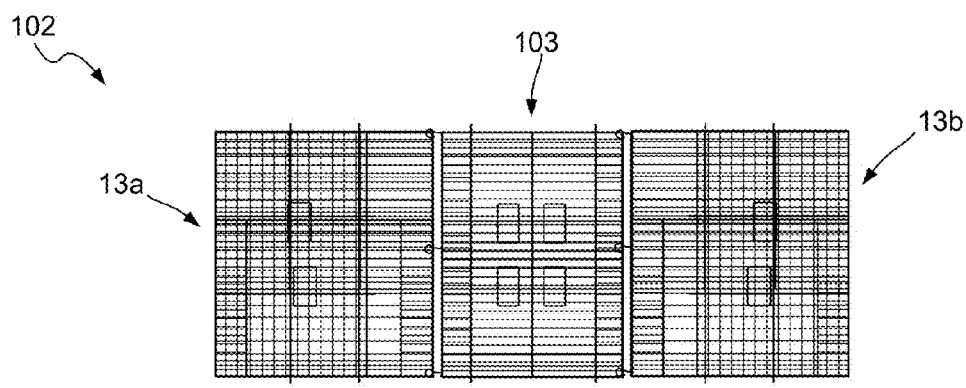

FIG. 15 is a perspective exploded view of the cage 102 showing the first, second and third cage assemblies 13a, 103, 13b separated from one another. FIGS. 16A and 16B are plan views of the cage 102 showing the cage 102 in substantially flat and collapsed states, respectively. In the illustrated embodiment, the third cage assembly 103 includes a top panel 106 having first and second side panels 108a, 108b extending therefrom. As shown in FIG. 15, when in the expanded state, the first and second side panels 108a, 108b oppose one another. Similar to the first and second cage assemblies 13a, 13b, the panels (106, 108a-108b) of the third cage assembly 103 may be substantially flat and planar and may be coupled to one another such that the cage 102 is substantially rectangular in shape when the first, second and third cage assemblies 13a, 13b, 103 are coupled to one another.

As shown in FIG. 16A, the first, second and third cage assemblies 13a, 13b, 103 may be releasably coupled to one another by one or more hooks 24. In the illustrated embodiment, in the event that a user desires to expand the cage 12 of FIG. 1, the user need only incorporate the third cage assembly 103 to create a larger expanded cage 102. For example, the third cage assembly 103 may be configured to be coupled to both the first and second cage assemblies 13a, 13b. In the illustrated embodiment, at least one of the side panels 108a, 108b and/or the top panel 106 of the third cage assembly may include at least one hook 24 configured to be coupled to an adjacent panel of the first cage assembly 13a. For example, as shown, hooks 24 may extend from the top panel 106 and first and second side panels 108a, 108b of the third cage assembly 103 such that associated panels of the first and third cage assemblies 13a, 103 may be coupled to one another. More specifically, the top panels 16, 106 of the first and third cage assemblies 13a, 103 may be coupled to one another by the associated hooks 24 and the first and second side panels 18a, 18b of the first cage assembly 13a may be coupled to the first and second side panels 22a, 22b of the second cage assembly 13b, respectively, by the associated hooks 24.

The second cage assembly 13b may be coupled to the third cage assembly 103 by way of one or more hooks 24. For example, hooks 24 may extend from the top panel 20 and first and second side panels 22a, 22b of the second cage assembly 13b. The top panels 20, 106 of the second and third cage assemblies 13b, 103 may be coupled to one another by the associated hooks 24. Similarly, the first and second side panels 22a, 22b of the second cage assembly 13b may be coupled to the first and second side panels 108a, 108b of the third cage assembly 103, respectively, by hooks 24.

Similar to the first and second cage assemblies 13a, 13b, one or more protrusions 26 may extend from the first and second side panels 108a, 108b of the third cage assembly 103, wherein each protrusion 26 may be configured to couple the third cage assembly 103 the associated third base member 105 of the base assembly 104, described in greater detail herein. It should be noted that some of the panels of the third cage assembly 103 may include one or more doors for permitting entry and egress from within the cage 102. For example, top panel 106 includes a door 110 pivotally supported so that the door 110 may move from a closed position, in which the door 110 is substantially parallel to the top panel 106, to an open position, in which the door 110 is substantially perpendicular to the top panel 110.

As shown in FIG. 16B, the cage 102 may be configured to move into a substantially flat position while the first, second and third cage assemblies 13a, 13b, 103 remain coupled to one another. As previously described, at least some of the panels may be coupled to one another by way of hinges, such that some panels may rotate in relation to one another while remaining attached. Accordingly, the cage 102 may be of knock down construction, where some of the panels may be folded into a substantially flat arrangement while still coupled to adjacent panels. For example, the panels of the first, second and third cage assemblies 13a, 13b, 103 may be folded into a more compact condition. It should be noted that the first, second and third cage assemblies 13a, 13b, 103 may further be folded onto one another into a more compact condition.

FIG. 17 is a perspective exploded view of base assembly 104 showing the first, second and third base members 15a, 15b, 105 separated from one another. FIG. 18 is a perspective view of the base assembly 104 in an assembled state. In the illustrated embodiment, the third base member 105 includes a floor 111 and two opposing side walls 112a, 112b extending upwardly from the floor 111 forming a cavity 114 therein. As shown, the side walls 112a, 112b terminate at associated edges 116a, 116b extending along a periphery of the third base member 105. As shown, the edges 116a, 116b may include one or more recesses or slots 118 shaped and/or sized to receive protrusions 26 extending from the first and second side panels 108a, 108b of the third cage assembly 103, thereby allowing the first and second side panels 108a, 108b to securely rest upon the associated edges 116a, 116b the corresponding side panels 112a, 112b of the third base member 105.

In the illustrated embodiment, in the event that a user desires to expand the base assembly 14 of FIG. 1, the user need only incorporate the third base member 105 to create the larger expanded base assembly 104. As shown, the third base member 105 may be configured to be coupled to both the first and second base members 15a, 15b. As shown, the first, second and third base members 15a, 15b, 105 may be coupled to one another by way of the floors 31, 36, 111. As shown, the floor 111 of the third base member 105 may include a first leading edge 120a adjacent a first open end and a second leading edge 120b adjacent a second open end opposing the first open end. The first and second leading edges 120a, 120b may be configured to cooperate with and matingly engage the leading edges 48, 50 of the first and second base members 15a, 15b, respectively.

For example, the first leading edge 120a of the third base member 105 may include first and second portions configured to matingly engage associated first and second portions of the leading edge 48 of the first base member 15a so as to releasably couple the first and third base members 15a, 105 to one another. Similarly, the second leading edge 120b may include first and second portions configured to matingly engage associated first and second portions of the leading edge 50 of the second base member 15b so as to releasably coupled the second and third base members 15b, 105 to one another. As previously described, the first and second portions of the leading edges 48, 50, 120a-120b may include any known coupling means, such as, for example, snap-fit means.

Upon coupling the first, second and third base members 15a, 15b, 105 to one another, the base assembly 104 is formed. More specifically, as shown in FIG. 18, when the base members are coupled to one another, the base assembly 104 may be substantially rectangular in shape, such that side walls 30a, 35a, 112a form a first side wall and side walls 30b, 35b, 112b form an opposing second side wall and side walls 30c and 35c oppose one another. The floors 31, 36, 111 may also meet at their respective leading edges 48, 50, 120a, 120b and form a substantially planar surface.

As may be appreciated, although not shown, the base assembly 104 may further include one or more locking members (similar to the locking members 40 and 54 of FIGS. 5-7) configured to retain the first and second base members 15a, 15b to the third base member 105. For example, locking members may be positioned over a portion of the edges 33, 38, 116 of the first, second and third base members 15a, 15b, 105, of the first base member 15a to retain at least a portion of the first, second and third base members 15a, 15b, 105 to one another and to prevent movement of the base members relative to one another. Additionally, additional locking members may be positioned over portions of the leading edges 48, 50, 120a, 120b of the floors 31, 36, 111 of the base members so as to cover any seams and to retain at least a portion of each of the base members to one another and prevent movement.

The third base member 105 may be configured to be stackable within the first and/or second base members 15a, 15b. For example, when in a disassembled state, the first base member 15a may be shaped and/or sized such that a portion of the third base member 105 may be received within the cavity 32 of the first base member 15a. It should be noted that the second base member 15b may be similarly configured to receive the third base member 105 within the cavity 37. Similarly, the third base member 105 may be shaped and/or sized such that a portion of the first and/or second base member 15a, 15b may be received within the cavity 114 in a stacking fashion.

As may be appreciated, the cage 12 and base assembly 14 may be expanded indefinitely by incorporating one or more cage assemblies and base members similar to the third cage assembly 103 and third base member 105, respectively. For example, in another embodiment, a user may desire to further expand the cage 102 and base assembly 104, and, as such, may further incorporate a fourth cage assembly (similar to the third cage assembly 103) and a fourth base member (similar to the third base member 105). Accordingly, a collapsible animal housing assembly consistent with the present disclosure provides a user with the ability to increase and/or decrease the size of the housing assembly to accommodate a variety of animals and their associated space requirements.

According to one aspect of the present disclosure, there is provided a collapsible animal housing assembly. The assembly includes a collapsible cage including a first cage assembly coupled to a second cage assembly, wherein the first and second cage assemblies are configured to transition between an expanded state and a collapsed state. The assembly further includes a base assembly for providing support for the collapsible cage, the base assembly including a first base member and a second base member and configured to transition between an assembled state and a disassembled state. The first and second base members are releasably engaged with one another to form the base assembly when the base assembly is in the assembled state. The first and second base members are configured to support the first and second cage assemblies, respectively, when the first and second cage assemblies are in the expanded state to form an enclosure. The first and second base members are disengaged from one another when the base assembly is in the disassembled state.

According to another aspect, there is provided a collapsible animal housing assembly. The assembly includes a collapsible cage including first, second and third cage assemblies coupled to one another, wherein the first, second and third cage assemblies are configured to transition between an expanded state and a collapsed state. The assembly further includes a base assembly for providing support for the collapsible cage, the base assembly including first, second and third base members and configured to transition between an assembled state and a disassembled state. The first, second and third base members are releasably engaged with one another to form the base assembly when the base assembly is in the assembled state. The first, second and third base members configured to support the first, second and third cage assemblies, respectively, when the first, second and third cage assemblies are in the expanded state to form an enclosure. The first, second and third base members are disengaged from one another when the base assembly is in the disassembled state.

The first and second cage assemblies each include a top panel having a substantially rectangular shape, a first side panel rotatably coupled to a first end of the top panel, a second side panel rotatably coupled to a second end of the top panel, and a third side panel rotatably coupled to a third end of the top panel. The third cage assembly includes a top panel having a substantially rectangular shape and a first side panel rotatably coupled to a first end of the top panel and a second side panel rotatably coupled to a second end of the top panel.

According to yet another aspect, there is provided a collapsible animal housing assembly. The assembly includes a collapsible cage including first, second and third cage assemblies coupled to one another, wherein the first, second and third cage assemblies are configured to transition between an expanded state and a collapsed state. The assembly further includes a base assembly for providing support for the collapsible cage, the base assembly including first, second and third base members and configured to transition between an assembled state and a disassembled state. The first, second and third base members are releasably engaged with one another to form the base assembly when the base assembly is in the assembled state. The first, second and third base members configured to support the first, second and third cage assemblies, respectively, when the first, second and third cage assemblies are in the expanded state to form an enclosure. The first, second and third base members are disengaged from one another when the base assembly is in the disassembled state.

The first and second cage assemblies each include a top panel having a substantially rectangular shape, a first side panel rotatably coupled to a first end of the top panel, a second side panel rotatably coupled to a second end of the top panel, and a third side panel rotatably coupled to a third end of the top panel. The third cage assembly includes a top panel having a substantially rectangular shape and a first side panel rotatably coupled to a first end of the top panel and a second side panel rotatably coupled to a second end of the top panel.

When in the expanded state, the third cage assembly is positioned between the first and second cage assemblies, wherein the top, first and second side panels of the third cage assembly are coupled to the top, first and second side panels of the first and second cage assemblies, respectively. The first side panels oppose the second side panels and the third side panels oppose one another to form a cage interior. The first and second base members each include a floor having a substantially rectangular shape and having first, second and third side walls extending upwardly therefrom forming a cavity within, the first and second side walls oppose one another and the third side wall opposes an open end. The third base member includes a floor having a substantially rectangular shape and having first and second side walls extending upwardly therefrom and opposing one another forming a cavity within and having first and second open ends opposing one another.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A collapsible animal housing assembly comprising:
   a collapsible cage comprising a first collapsible cage assembly coupled to a second collapsible cage assembly, wherein said first and second collapsible cage assemblies are each configured to transition between an expanded state and a collapsed state;

a base assembly for providing support for said collapsible cage, said base assembly comprising a first base member and a second base member, the first and second base members configured to transition between an assembled state and a disassembled state; and first and second locking members;

wherein:

said first and second base members each comprise a floor and first, second and third sidewalls extending upwardly therefrom to form a cavity, the first and second sidewalls oppose one another and the third sidewall opposes an open end of a respective one of the first and second base members;

the first, second and third sidewalls of each of said first and second base members each comprise a top edge, and the first and second sidewalls of each of the first and second base members further comprise respective first and second sidewall leading edges;

said first and second base members are configured to releasably engage with one another to form said base assembly when said base assembly is in said assembled state and to support said first and second cage collapsible assemblies, respectively, when said first and second collapsible cage assemblies are in said expanded state to form an enclosure;

the first and second locking members each comprise a body portion having a channel that is configured to receive and couple the first and second locking members to at least a portion of the top edge of a respective one of the first and second sidewalls of the first and second base members;

in said assembled state, the first and second sidewall leading edges of the first base member couple with the first and second sidewall leading edges of the second base member, respectively, and the first and second locking members are configured to slide between an unlocked and locked position, wherein in the locked position, the channel of each of the first and second locking members spans a seam between a respective one of the first and second sidewall leading edges of the first and second sidewalls of the first and second base members, so as to reinforce the coupling of said first and second base members;

said first and second collapsible cage assemblies each comprise a top panel having a substantially rectangular shape, a first side panel rotatably coupled to a first end of said top panel, a second side panel rotatably coupled a second end of said top panel, and a third side panel rotatably coupled to a third end of said top panel; and when in said expanded state, at least the top panel of said first collapsible cage assembly is coupled to the top panel of said second collapsible cage assembly.

2. The assembly of claim 1, wherein, when in said expanded state, said top, first and second side panels of said first collapsible cage assembly are coupled to said top, first and second side panels of said second collapsible cage assembly, respectively.

3. The assembly of claim 2, wherein when in said expanded state, said first side panels oppose said second side panels and a said third side panels oppose one another to form a cage interior.

4. The assembly of claim 1, wherein, when transitioning from said expanded state to said collapsed state, at least one of said first, second and third side panels may be configured to rotate relative to said top panel in a direction towards an opposing side panel and be folded into a substantially flat engagement with said top panel when in said collapsed state.

5. The assembly of claim 1, wherein the top edge of each of said first, second and third sidewalls comprise at least one recess configured to receive and retain at least one protrusion extending from a portion of at least one of said first and second collapsible cage assemblies.

6. The assembly of claim 1, wherein said floor of said first base member comprises a first leading edge proximate the open end thereof, said floor of said second base member comprises a second leading edge proximate the open end thereof, wherein the first and second leading edges are configured to matingly engage one another.

7. The assembly of claim 6, wherein, when in said assembled state, the first and second leading edges engage one another in a snap fit manner.

8. The assembly of claim 6, further comprising a third locking member, wherein in the assembled state, the third locking member is coupled to a portion of said first leading edge and a portion of the second leading edge and over a seam defined between said first and second leading edges, the third locking member configured to retain said first and second leading edges to one another and to prevent substantial movement of said first and second leading edges relative to one another.

9. The assembly of claim 1, wherein said first and second base members are correspondingly shaped and sized to allow a stackable configuration with one another when in a disassembled state.

10. A collapsible animal housing assembly comprising:

a collapsible cage comprising first, second and third collapsible cage assemblies coupled to one another, wherein said first, second and third collapsible cage assemblies are each configured to transition between an expanded state and a collapsed state;

a base assembly for providing support for said collapsible cage, said base assembly comprising first, second and third base members, the first, second and third base members each configured to transition between an assembled state and a disassembled state; and first, second, third, and fourth locking members;

wherein:

said first and second base members each comprise a floor and first, second and third sidewalls extending upwardly therefrom to form respective first and second cavities, the first and second sidewalls oppose one another and the third sidewall opposes an open end of a respective one of the first and second base members, the first, second and third sidewalls each of the first and second base members each comprise a top edge;

said third base member comprises a floor and first and second sidewalls extending upwardly therefrom, the first and second sidewalls of the third base member opposing one another so as to define a third cavity with two open ends;

the first and second sidewalls of each of the first, second, and third base members each comprise a top edge, the first and second sidewalls of the first and second base members further comprise respective first and second sidewall leading edges, and the first and second sidewall of the third base member each comprise fourth, fifth, sixth, and seventh sidewall leading edges, the fourth and fifth sidewall leading edges being proximate one of the openings of the third cavity, and the sixth and seventh sidewall edges being proximate the other of the openings of the third cavity;

when said base assembly is in said assembled state, the first base member is configured to releasably engage the third base member at one of the two openings of said third cavity, and the second base member is configured to releasably engage the third base member at the other of the two openings of said third cavity to form said base assembly, and to support said first, second and third collapsible cage assemblies, respectively;

the first, second, third and fourth locking members each comprise a body portion having a channel that is configured to receive and couple the first, second, third, and fourth locking members to at least a portion of the top edge of a respective one of the first and second sidewalls of the first, second, and third base members;

in said assembled state, the first and second sidewall leading edges of the first base member couple with the fourth and fifth sidewall leading edges of the third base member respectively, the first and second sidewall leading edges of the second base member couple with the sixth and seventh sidewall leading edges, respectively, and the first, second, third, and fourth locking members are configured to slide between a locked and unlocked position;

in the locked position, the channel of each of said first and second locking members span a seam between the leading edges of a respective one of the first and third base members, and the channel of each of the third and fourth locking members span a seam between the leading edges of a respective one of the second and third base members, so as to reinforce the coupling of the first, second and third base members;

said first and second collapsible cage assemblies each comprise a top panel having a substantially rectangular shape, a first side panel rotatably coupled to a first end of said top panel, a second side panel rotatably coupled to a second end of said top panel, and a third side panel rotatably coupled to a third end of said top panel;

said third collapsible cage assembly comprises a top panel having a substantially rectangular shape and a first side panel rotatably coupled to a first end of said top panel and a second side panel rotatably coupled to a second end of said top panel; and when in said expanded state, the top panel of said first collapsible cage assembly is coupled to a third end of the top panel of said third collapsible cage assembly, and the top panel of said second collapsible cage assembly is coupled to a fourth end of the top panel of said third collapsible cage assembly.

11. The assembly of claim 10, wherein, when in said expanded state, said third collapsible cage assembly is positioned between said first and second collapsible cage assemblies, wherein said top, first and second side panels of said third collapsible cage assembly are coupled to said top, first and second side panels of said first and second collapsible cage assemblies, respectively, wherein said first side panels oppose said second side panels and said third side panels oppose one another to form a cage interior.

12. The assembly of claim 10, wherein the top edge of each of the first and second sidewalls of the first, second, and third base comprise at least one recess configured to receive and retain at least one protrusion extending from a portion of at least one of said first, second and third collapsible cage assemblies.

13. The assembly of claim 10, wherein:
said floor of said third base member defines a first leading edge at one of said two open ends, and a second leading edge at the other of said two open ends;
the floor of the first base member defines a third leading edge at the open end of the first base member;
the floor of the second base member defines a fourth leading edge at the open end of the second base member
when in said assembled state, said first leading edge matingly engages third leading edge and said second leading edge matingly engages the fourth leading edge.

14. The assembly of claim 10, wherein said first, second and third base members are correspondingly shaped and sized to allow a stackable configuration with one another when in a disassembled state.

* * * * *